M. D. Fowler,

Cage Trap.

No 81,268.  Patented Aug. 18, 1868.

Witnesses:  Inventor.
Wm Dean Overell  M. D. Fowler
G. C. Cotton  per  [signature]
  Attorney

United States Patent Office.

M. D. FOWLER, OF VINCENNES, INDIANA.

Letters Patent No. 81,268, dated August 18, 1868.

IMPROVED RAT-TRAP.

*The Schedule referred to in these Letters Patent and making part of the same.*

TO ALL WHOM IT MAY CONCERN:

Be it known that I, M. D. FOWLER, of Vincennes, in the county of Knox, and State of Indiana, have invented a new and useful Improvement in Rat-Traps; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish a simple, convenient, and reliable rat-trap, which shall be so constructed and arranged as to catch, without fail, any animal that may enter the trap and try to eat the bait.

And it consists in the construction and combination of the various parts, as hereinafter more fully described.

A is the bottom of the trap, which is designed to be placed over a water-reservoir, or some other suitable and secure receptacle for the rats.

The central part of the bottom A is cut away, forming a rectangular hole, into which is fitted the drop B. The drop B, near one of its side edges, is pivoted to the bottom, A, so that when left free, the drop B will hang in a vertical position.

Figure 2:
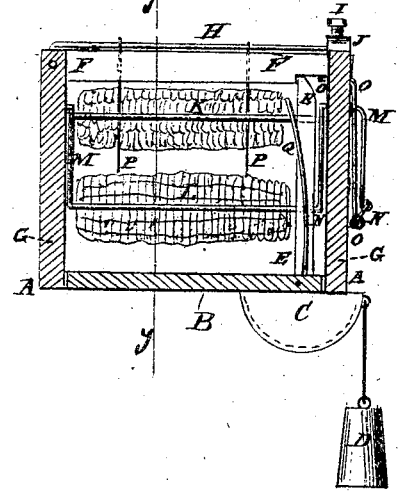
Figure 2 is a vertical cross-section of the same, taken through the line $x\,x$, fig. 1.

To the middle part of the under side of the drop B, at its pivoted edge, is attached a semicircular segment, C, of a grooved wheel, as shown in fig. 2. To the projecting outer edge of the segment C is attached, by a flexible cord or chain, a weight, D, of sufficient size to slightly overbalance the weight of the drop B, and to bring it again into a horizontal position whenever it may have been pushed down from that position by any means. To the upper side of the drop B, near its pivoted edge, is attached an arm, E, the upper end of which catches upon a shoulder, formed upon the pivoted bar F, so as to lock the drop B in a horizontal position.

Figure 1:
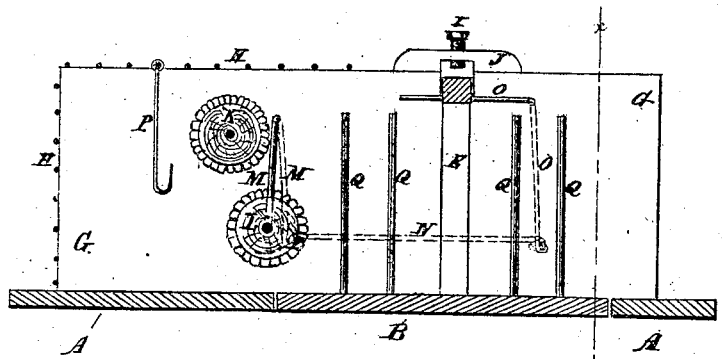
Figure 1 is a vertical longitudinal section of my improved trap, taken through the line $y\,y$, fig. 2.

To the upper side of the bottom, A, along its side edges, are attached the side-boards G, which are connected at their forward ends, and at the forward part of their upper edges, by the wire bars or grating H, so as to enclose the space in which the bait is suspended, and to prevent the rats from approaching said bait otherwise than by passing over the drop B. One end of the catch-lever or bar F is pivoted in a notch in the upper edge of one of the side-boards G, and its other end works in a similar notch in the other side-board, where its play is limited by the set-screw I passing in through the keeper J, attached to the edge of the said board G, and passing over the said notch, as shown in fig. 1.

K is an ear of corn pivoted to the upper part of the side-boards G, by a wire passing through the centre of the cob, so that the said ear may revolve so easily that the rat cannot get a kernel of the corn.

L is an ear of corn suspended from and pivoted to the sides G by the hook-shaped wires M, so that the rat, in seeking to get the corn, will push the ear from him. One of the hook-shaped wires M passes through and extends down along the outer side of the side-board G, and to its lower end is pivoted one end of the connecting-wire or rod N, the other end of which is pivoted to the lower end of the bent-lever trigger O, which passes up along the outer side of the side-board G, through said side-board near its upper edge, and horizontally along its inner side, so as to pass beneath the lever-catch F, as shown in figs. 1 and 2. By this arrangement the slightest movement of the bait L will lift the catch F from the arm E, precipitating the rat into the receptacle beneath. If desired, any other bait attractive to rats may be used, either suspended in the manner described, or suspended from hooks P, in addition to the corn or other bait suspended in the manner described, and as an additional inducement to the rats.

Q are upwardly-projecting arms, attached to the upper side of the drop B, along its pivoted edge, which, as the drop B falls, strike against the rat and force him down into the receptacle, should he attempt to sustain himself by clinging to the trap.

I claim as new, and desire to secure by Letters Patent—

The arrangement herein shown and described with relation to the catch-arm E and lever-catch F, of the crank-shaft M, connection N, and angular lifting-lever O, all arranged within the trap A G H, to operate as set forth, for the purpose specified.

his
M. D. × FOWLER.
mark.

Witnesses:
JAMES S. MAYES,
HENRY V. SOMES.